United States Patent
Lee et al.

(10) Patent No.: US 8,020,311 B2
(45) Date of Patent: Sep. 20, 2011

(54) TAPE MEASURES

(75) Inventors: Barry Howard Lee, Rayleigh (GB); Mike Elam, London (GB); Michael John Levick, Southend-on-Sea (GB)

(73) Assignee: Fisco Tools Limited, Rayleigh, Essex (GB)

( * ) Notice: Subject to any disclaimer, the term of this patent is extended or adjusted under 35 U.S.C. 154(b) by 105 days.

(21) Appl. No.: 12/087,528

(22) PCT Filed: Jan. 9, 2007

(86) PCT No.: PCT/GB2007/000044
§ 371 (c)(1),
(2), (4) Date: Dec. 3, 2008

(87) PCT Pub. No.: WO2007/080388
PCT Pub. Date: Jul. 19, 2007

(65) Prior Publication Data
US 2009/0217541 A1   Sep. 3, 2009

(30) Foreign Application Priority Data

Jan. 9, 2006   (GB) .................................. 0600318.0

(51) Int. Cl.
*G01B 3/10* (2006.01)
(52) U.S. Cl. ................. 33/770; 33/755; 33/758; 33/761
(58) Field of Classification Search ............. 33/755, 33/756, 767, 769, 761, 758, 759
See application file for complete search history.

(56) References Cited

U.S. PATENT DOCUMENTS

| | | | | |
|---|---|---|---|---|
| D208,066 S | * | 7/1967 | Collura et al. | D10/72 |
| 5,131,122 A | * | 7/1992 | Lavoto | 24/625 |
| D365,769 S | * | 1/1996 | Kang | D10/72 |
| D377,911 S | * | 2/1997 | Ogasawara | D10/72 |
| D410,859 S | * | 6/1999 | Hioki | D10/72 |
| D418,765 S | * | 1/2000 | Martone et al. | D10/72 |
| D422,227 S | * | 4/2000 | Lin | D10/72 |
| D478,292 S | * | 8/2003 | Hsu | D10/72 |
| D489,012 S | * | 4/2004 | Olson | D10/72 |
| D524,666 S | * | 7/2006 | Huang | D10/72 |
| 7,415,778 B1 | * | 8/2008 | McEwan et al. | 33/761 |
| 7,434,330 B2 | * | 10/2008 | McEwan et al. | 33/770 |
| 2004/0064961 A1 | | 4/2004 | Harris et al. | |
| 2008/0196265 A1 | * | 8/2008 | McEwan et al. | 33/758 |
| 2009/0300931 A1 | * | 12/2009 | Lee et al. | 33/767 |

FOREIGN PATENT DOCUMENTS

| | | |
|---|---|---|
| CN | 2440198 Y | 5/2001 |
| DE | 11 95 957 B | 7/1965 |

* cited by examiner

*Primary Examiner* — Yaritza Guadalupe-McCall
(74) *Attorney, Agent, or Firm* — Buchanan Ingersoll & Rooney PC (57) ABSTRACT

A tape measure having a winding drum or reel rotatably mounted on a support structure, and a measuring tape attached to the drum so as to be coilable thereon. The support structure comprises a handle that extends radially beyond an upper half of the coiled tape and a bottom edge portion that extends radially beyond a lower half of the coiled tape, the bottom edge portion comprising a hand grip.

20 Claims, 10 Drawing Sheets

TAPE MEASURES

This application is a National Stage filing under 35 U.S.C. §371 of International Application No. PCT/GB2007/000044, filed on Jan. 9, 2007, now published as WO 2007/080388, which in turn claims priority to British Application No. 0600318.0, filed Jan. 9, 2006, the entire contents of which are incorporated herein by reference.

FIELD OF THE INVENTION

The present invention relates to tape measures and is particularly, although not necessarily exclusively, applicable to tape measures of a type known as 'long tapes'.

BACKGROUND

Tape measures for distances of 10 metres or greater (so-called 'long tapes') tend to differ from those for shorter distances in that in most cases there is no spring mechanism for returning the tape (generally referred to as a 'blade' in shorter tapes) to a spooled condition. To unwind the 'long' tape, the required length of tape is simply pulled out. A winding handle is generally provided to spool the tape, the tape being rewound by turning this winding handle in the appropriate direction with one hand whilst gripping the tape measure with the other. The tape itself generally has an end piece that includes a hook or loop or can be used in conjunction with a separate hook or peg to fix the tape end to the ground.

One conventional form of 'long tape' measure has a winding drum or spool that is rotatably mounted on a frame. The measuring tape is attached at one end to the drum so that it can be coiled around the drum within the frame. At least one side face of the drum is exposed at an aperture in the frame. A winding handle is mounted on a centre moulding which is attached to (or located in) the exposed part of the side of the winding drum so that it can be used to return the tape to its spooled condition.

The frame generally also includes a handle extending beyond and above the spooled tape, which can be grasped to hold the tape measure as the tape is drawn out or rewound. The frame may also include a protrusion diametrically opposite the handle that tapers to a point that can be pressed against the ground when taking a measurement to help hold the tape taught.

Another conventional form of 'long tape' measure has a case with first and second circular side walls spaced apart from each other with their peripheries connected by an edge wall, so as to define a generally disc shaped enclosure within which the winding drum and the tape spooled on it are housed. The winding drum is supported by the side walls, the axis of the drum passing through the centre of one or both side walls, and a winding handle is attached to the drum at one of the side walls. The tape can be drawn out from the casing through a slot (often provided by a "mouthpiece") in the edge wall of the casing and rewound by turning the winding handle with one hand whilst gripping the casing with the other. The drum may be a one piece moulding with the winding handle attached to it or there may be a separate drum and centre mouldings with the winding handle attached to a centre moulding.

Many 'long tapes' are used by professionals, such as surveyors, estates agents and builders. They are often used to take many measurements in a short period of time. It is important that such tapes are easy to use and enable very accurate measurements to be taken by a single operator. However, in practice, the conventional designs of tape can be awkward to hold as the tape is rewound using the winding handle.

SUMMARY OF INVENTION

In one aspect, the present invention provides a tape measure having a winding drum or reel rotatably mounted on a support structure, and a measuring tape attached to the drum so as to be coilable thereon, the support structure comprising a handle that extends radially beyond an upper half of the coiled tape and a bottom edge portion that extends radially beyond a lower half of the coiled tape, the bottom edge portion comprising a hand grip.

The handle and hand grip are preferably diametrically opposite one another. The hand grip preferably extends along the bottom edge of the support structure and on one or both sides of the bottom edge portion of the support structure adjacent its bottom edge, most preferably both sides in order that it can be grasped in one hand with the palm of the hand against the grip on one side of the bottom edge portion of the support structure and the fingers wrapped around the bottom edge of the support structure onto the grip on the other side of the bottom edge portion.

One or more stepped features or shoulders may define the boundary or portions of the boundary of the hand grip. Preferably the hand grip is a recess formed in the bottom edge portion of the support structure. The recess may extend along the bottom edge of the support structure and/or up either or both sides of the bottom edge portion.

The hand grip may comprise one or more recessed or raised grip features such as ribs, grooves or dimples for example. The surface of the hand grip may additionally or alternatively be textured or contoured to improve the grip and/or shaped or otherwise configured to fit the palm grip of the user.

In preferred embodiments, the hand grip comprises a grip element applied to the surface of the bottom edge portion of the support structure. The grip element is preferably formed from a material having a higher coefficient of friction than the surface of the support structure itself. Suitable materials include rubbers, thermoplastic elastomers (TPE) such as SEBS or polyurethane. The surface of the grip element may be textured or contoured to improve the grip. For instance a series of ribs may be formed in the surface of the grip element. Where the hand grip is a recess formation, the grip element may be seated in the recess. The grip element may be shaped or otherwise configured to fit the palm grip of the user.

Preferably the tape measure includes a mouth aperture through which the tape is drawn off the winding drum and the hand grip extends forward of this mouth above a projection of the path the tape follows as it exits the mouth. The mouth may be formed at the lower end of a snout portion of the support structure that projects below the bottom edge portion of the support structure in which the hand grip is formed.

In another aspect, the invention provides a tape measure having a winding drum or reel rotatably mounted on a support structure, a measuring tape attached to the drum so as to be coilable thereon and a mouth through which the tape measure is drawn off the drum, the support structure comprising a hand grip at an edge portion radially beyond the coiled tape, the hand grip extending forward of the mouth above a projection of the path the measuring tape follows as it exits the mouth.

The mouth may be formed at the lower end of a snout portion of the support structure that projects below the bottom edge portion of the support structure in which the hand grip is formed.

In both aspects of the invention above, the support structure may be a frame or a casing. The tape measure is preferably a long tape.

In a further aspect, the present invention provides a tape measure having a winding drum or reel rotatably mounted on an open frame, and a measuring tape attached to the drum so as to be coilable thereon, the frame comprising a bottom edge portion radially beyond a lower half of the coiled tape, the bottom edge portion comprising a hand grip Features discussed above in the context of the tape measure of the first aspect are equally applicable to tape measures in accordance with the other aspects of the invention.

BRIEF DESCRIPTION OF DRAWINGS

An embodiment of the present invention will now be described by way of example only with reference to the accompanying drawings, in which:—

DESCRIPTION OF EMBODIMENTS

Figure 4:
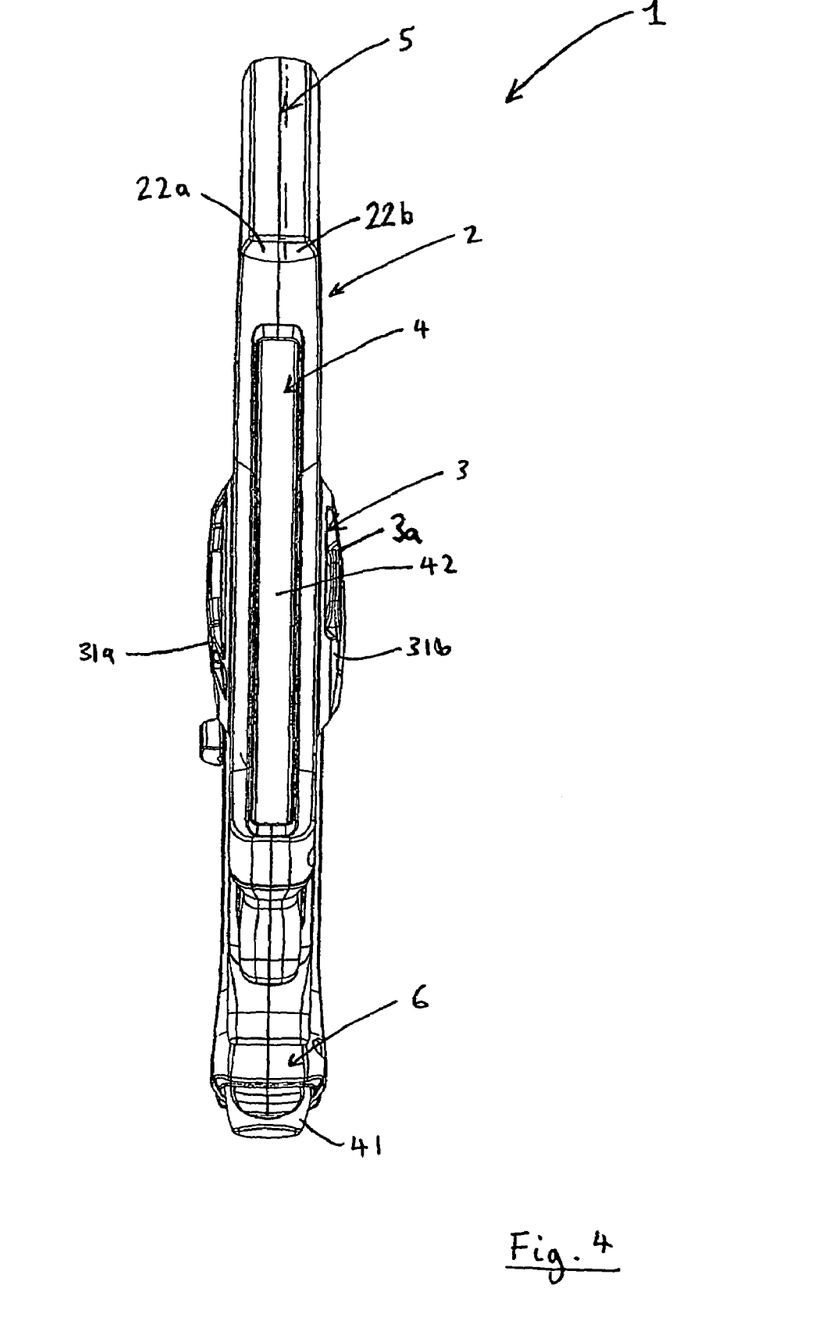
FIG. 4 is a front view of the tape measure.
Figure 5:
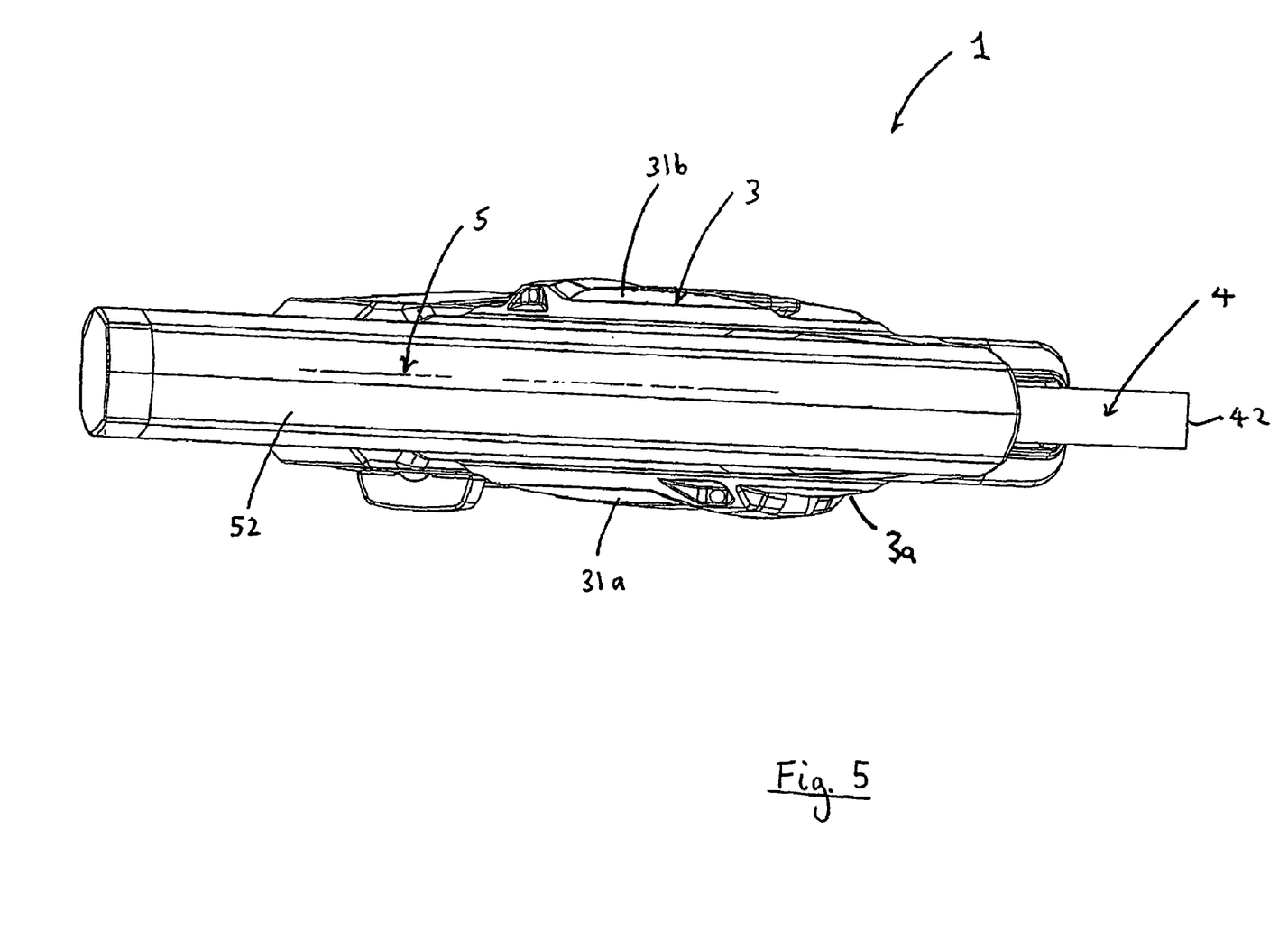
FIG. 5 is a top plan view of the tape measure.

The tape measure 1 comprises a frame 2 made from a pair of injection moulded half shells 21a, 21b, lateral projections 22a, 22b of the shells abutting one another at the top and bottom of the frame, as best seen in FIG. 4. The shells 21a, 21b are joined to one another by screws and/or other appropriate joining methods such as sonic welding or interlocking 'click-fit' features.

A winding assembly 3, on which a measuring tape 4 is wound, is rotatably mounted in a centre portion of the frame 2. The winding assembly comprises a centre moulding 3a and a drum (not shown) fixed to rotate with the centre moulding 3a. The drum and the centre moulding 3a may be formed as a single moulding or formed as separate components that are subsequently assembled. The centre moulding 3a itself may be formed in more than one piece.

One end of a measuring tape 4 is attached to the winding assembly 3 either directly or by means of a flexible joining strip or 'leader', and the tape coils up around the outer surface of the drum within the frame 2.

The measuring tape 4 may be made of material conventionally used for long tapes, such as steel or glass-reinforced fibre, and has a hook or loop 41 at its free end that can be used to fix that end to the ground or other reference position.

In this example, the centre moulding 3a of the winding assembly 3 comprises two parts 31a, 31b that screw together through large holes in side walls of the frame half shells 21a, 21b. Annular bearing surfaces abut the outer of the frame side walls around the centre holes thereby retaining the winding assembly 3 axially within the frame 2.

Two winding handles 33a, 33b are mounted on the winding assembly 3, one to each side. The opposite sides of the centre moulding 3a each have a slightly domed surface 34 with a channel 35 bounded by parallel side walls 36 extending diametrically across the domed surface 34. A lip 37 with a concave inner wall closes one end of the channel 35. A pin 38 runs perpendicularly between the two channel side walls 36 near, but spaced from, the opposite end of the channel. One end of the winding handle 33a, 33b is hinged on this pin 38.

When either winding handle 33a, 33b is not in use it can lie within the channel 35 with its upper surface generally flush with the domed surface 34 of the drum. When it is required to wind in the tape 4, one of the handles 33a, 33b is turned outwards around the hinge pin 38 to extend outwardly from the winding assembly 3, exposing a winding knob rotatable on a spindle projecting from the handle 33a, 33b. When the handle 33a, 33b is not in use this spindle and winding knob fit into a recess in the surface of the centre moulding 3a.

Each of the two frame half shells 21a, 21b, which are mirror images of one another, have side wall portions 23 that are generally triangular in shape (see FIGS. 2 and 3), tapering from a relatively broad base 24 that encloses about 90 degrees of the circumferential extent of the spooled tape to a narrower top 25 that extends around about 20 degrees of the circumferential extent of the tape. The triangular side walls 23 of the housing are skewed slightly towards the front edge 42 of the tape measure 4 with the top 25 of the 'triangle' being diametrically opposed to the rear end 241 of the base 24 of the 'triangle'.

The frame has a pistol grip handle 5 that protrudes rearwardly from the top 25 of the triangular side walls 23, above the coiled tape 4. The handle 5 is curved in the plane of the coiled tape 4 to generally follow the perimeter of the coiled tape 4 but is spaced sufficiently from it to allow a person to grasp the handle 5 with clearance between the tape coil and their knuckles even when the tape 4 is fully rewound (as seen in the figures).

A first grip insert 51 wraps around the underside and the rear end of the handle 5, extending partly up each side of the handle 5 and down onto the rear edges of the top 25 of the frame side walls 23. It sits within a recess in this example to lie flush with the sides 52 of the handle above the grip and the frame side walls 23. A second grip insert 53 is provided wrapping around the front end of the handle 5 and the front edges of the top ends 25 of the frame side walls 23. This grip 53 is also sat in a recess to lie flush with the surface of the frame 2.

A further grip element (not shown) may be provided on the top of the handle 5 to rest against a user's chest or upper arm when the tape measure is grasped by the lower grip in the manner discussed below.

Mounted in an aperture 55 on the underside of the handle 5 there is a trigger 54 that can be squeezed with one or more fingers when the handle 5 is grasped. As the trigger 54 is squeezed it moves from an initial position to a depressed position in which it causes a brake to engage the winding assembly 3 to resist and, if the trigger is sufficiently depressed, to stop its rotation. The trigger 54 is connected by a linkage that runs along the inner wall of one or both of the frame half shells 21a, 21b to a brake mechanism associated with the winding assembly 3. The trigger 54 is resiliently urged toward its initial position, so that the drum brake is released when the trigger 54 is released.

The trigger actuated brake can conveniently be used with one hand (the hand holding the tape measure 1) to lock the winding assembly 3 so that the tape 4 can be pulled taught when a measurement is to be taken (with the other end of the tape being fixed to the ground or held in some other way).

The trigger 54 may have a lock associated with it to retain the trigger in a depressed state (in which it brakes the winding assembly 3). For instance, the trigger 54 mechanism may include an interlock element that engages the trigger 54 or the associated linkage when it is depressed to lock the trigger 54 in this position. Alternatively, the trigger 54 itself may include a locking formation (e.g. a step or a projection 56) that through appropriate manipulation of the trigger 54 can be brought into engagement with the inside edge of the aperture 55 in the handle in which it is mounted to prevent the trigger 54 returning to its initial position.

Figure 1:
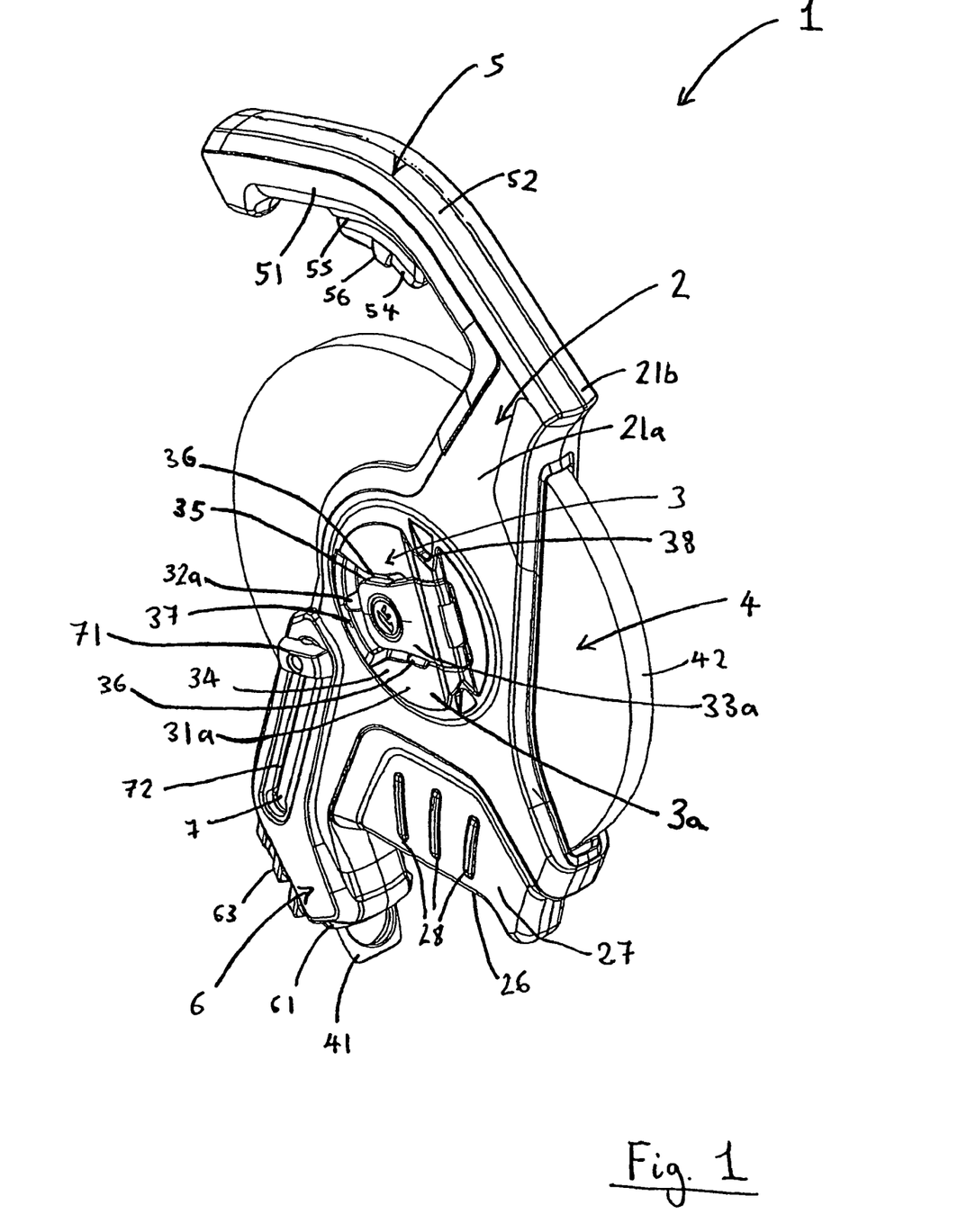
FIG. 1 is an oblique view of a tape measure in accordance with an embodiment of the present invention.
Figure 2:
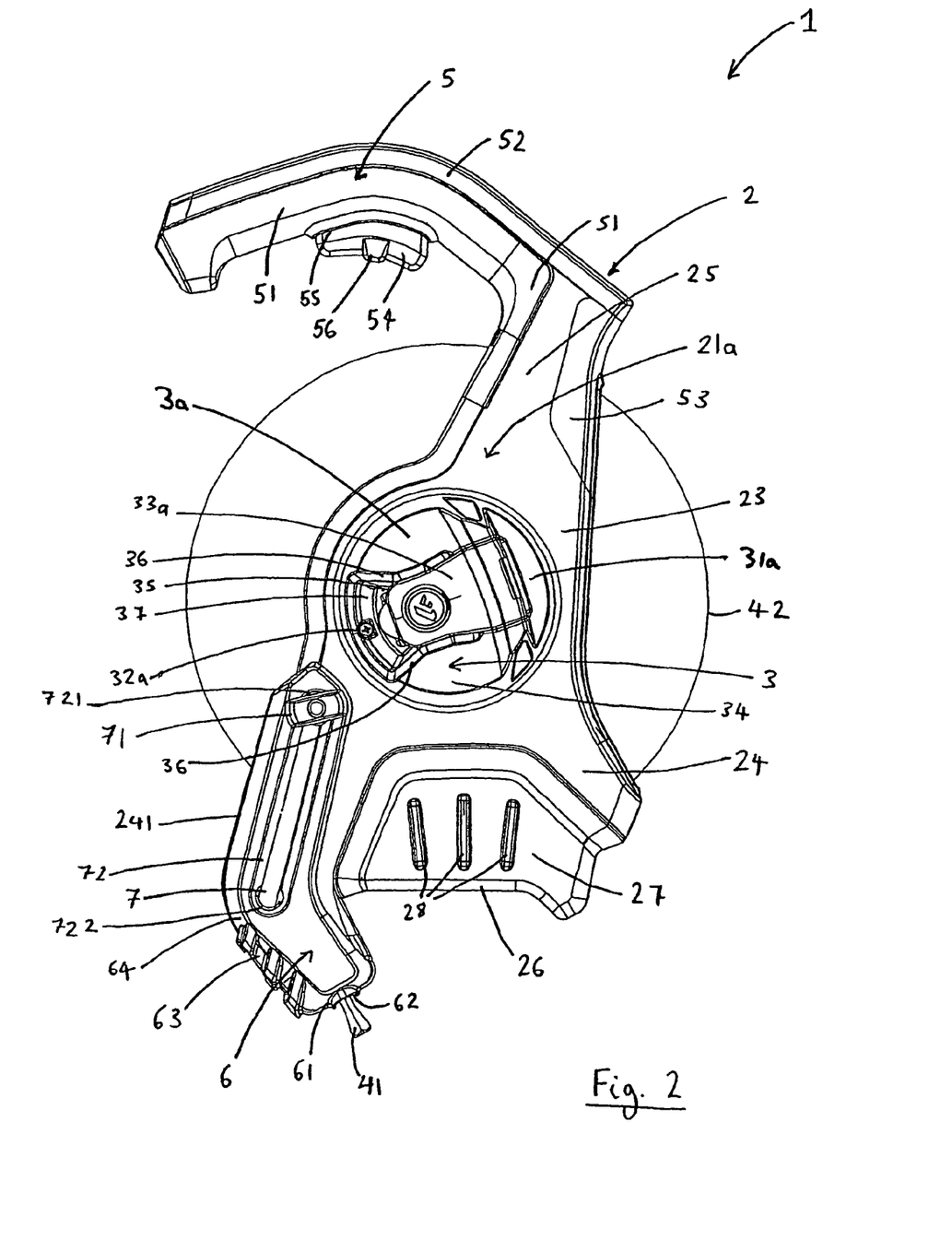
FIG. 2 is a side view from one side of the tape measure.
Figure 3:
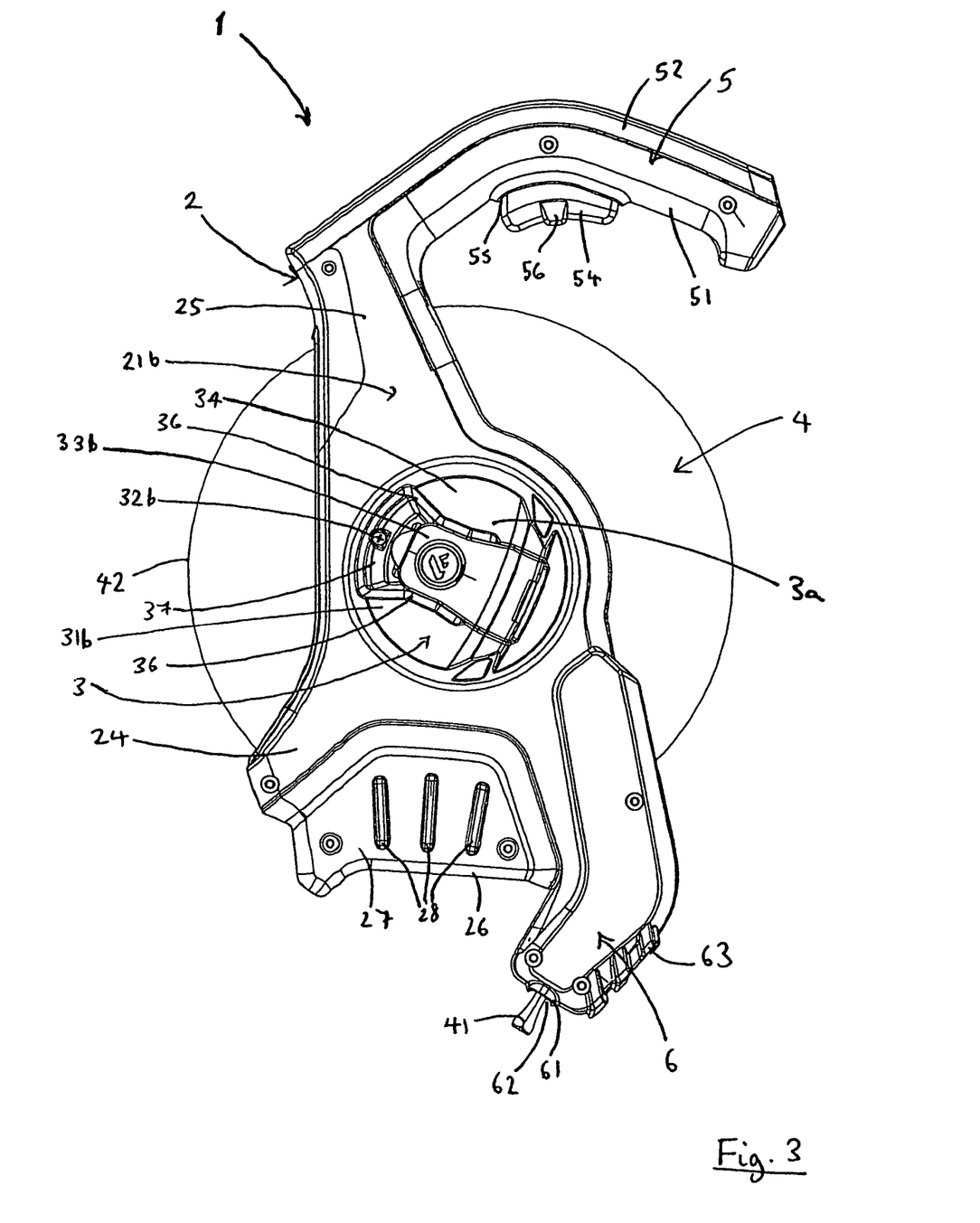
FIG. 3 is a side view from the other side of the tape measure.

At the rear end of the base 24 of the frame member 2 there is an elongate snout portion 6 that protrudes downwardly beyond the coiled tape 4 and is angled forward, in this example at about 45 degrees to the vertical (as seen in FIGS. 2 & 3). The snout 6 terminates in a mouth 61 that includes a slot 62 through which the tape 4 is drawn off the coil. A series of guide elements within the snout 6 define a path for the tape to follow from the periphery of the tape coil to the mouth 61 of the snout 6. In use, the tape is drawn out through the slot 62 in the snout manually (e.g. by grasping the tape a pulling it through the slot or by fixing the free end of the tape and then walking the tape measure away from the fixed free end of the tape) and rewound back through the snout 6 using one of the winding handles 33a, 33b in the manner described above.

The configuration of the handle 5 and the snout 6, with the handle 5 and snout 6 both being offset to one side of the winding drum 3, provides a very balanced arrangement that naturally hangs in the orientation seen in the figures when the handle 5 is grasped in one hand. With the hook or loop 41 at the free end of the tape 4 fixed to the ground, the tape 4 can be drawn out by walking the tape measure 1 away from the fixed free end holding the handle 5 with a comfortable grip. The forward inclination of the snout 6 (which therefore points towards the line of the deployed tape allows the tape 4 to be drawn off the coil with the minimum of resistance as, even when the snout 6 is held close to the ground, the tape 4 does not have to take a sharp turn as it exits the mouth 61.

Conveniently, the tape 4 can be cleaned as it is retracted by grasping the snout 6 in the palm of one hand with the thumb and one or two fingers holding a cloth around the tape 4 adjacent the mouth 61 of the snout 6 so that the tape 4 is drawn through the cloth as it is rewound onto the winding drum 3. A grip element 63 is provided on the snout.

The tape measure 1 includes a further grip formation 26 at the base 24 of the triangular side walls 23 of the frame 2. This lower grip 26 is diametrically opposed to the pistol grip handle 5, forward of the snout 6. The lower grip 26 extends along a sufficient length of the base 24 of the frame for it to be comfortably grasped with the whole hand, with the palm on the grip on one side of the frame 2 and the fingers wrapping around the underside of the frame 2 to the grip on the other side of the frame 2.

The lower grip formation 26 includes a recess that extends along the underside of the base 24 of the frame 2 and wraps up onto both side walls of the frame 2. A grip element 27, for example a rubber insert or over-moulding, is located in the recess and has a series of ribs 28 to improve the grip even when the tape measure 1 is wet.

Conveniently, the lower grip 26 can be used to hold the tape measure 1 as the tape is rewound. Whilst grasping this lower grip 26 with one hand the user can press the pistol grip handle 5 into their body or upper arm to stabilise the tape measure 1 whilst operating one of the winding handles 33a, 33b with the other hand.

Compared with conventional tape measures with only an upper handle to grasp as the tape is rewound, this provides a much better (from and ergonomical perspective) configuration for the user. To operate the winding handle whilst holding the upper handle requires the user to raise the tape measure up with the hand holding the upper handle in order that the other hand can reach the winding handle. This places a lot of strain on the carrying hand and arm. In contrast, when using the lower grip to hold the tape measure with one hand, the other hand can easily reach and operate the winding handle without the need to raise the carrying hand. This allows for a significantly more comfortable operation by the user.

The lower grip can also provide an alternative carrying position (i.e. as an alternative to carrying the tape measure by grasping the upper handle). Some users may find this more comfortable.

An adjustable spike 7 is housed within the frame 2 at the rear end of the base 24 of the frame member 2. It is mounted on the frame 2 to be displaceable between a fully retracted position (seen in the figures), in which a lower end of the spike 7 is retracted within the frame 2, and an extended position in which the lower end of the spike 7 protrudes beyond the bottom of the snout 6.

Figure 7:
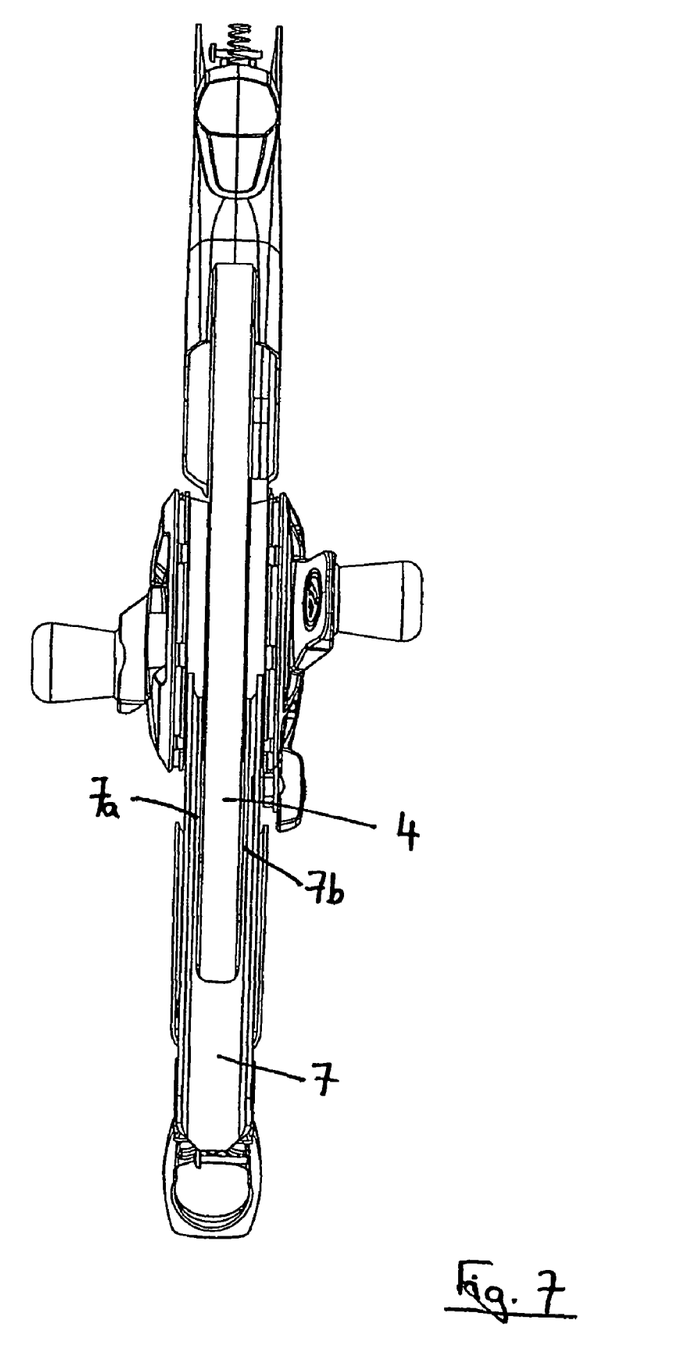
FIG. 7 is a rear view of the tape measure with the components of a frame part removed to more clearly show the form of a ground engaging spike housed within the frame.

In the retracted position, the spike 7 extends from a position near, but off set from, the winding assembly 3, toward a position adjacent the rear end 64 of the snout 6. The upper end of the spike 7 has a fork shape (seen in FIG. 7, which is a rear view of the tape measure with parts of the frame removed to show the full extent of the spike 7). The two arms 7a, 7b of the upper end of the spike 7 extend one to either side of the coiled tape 4 so that the spike 7 straddles the tape 4.

Figure 8A:
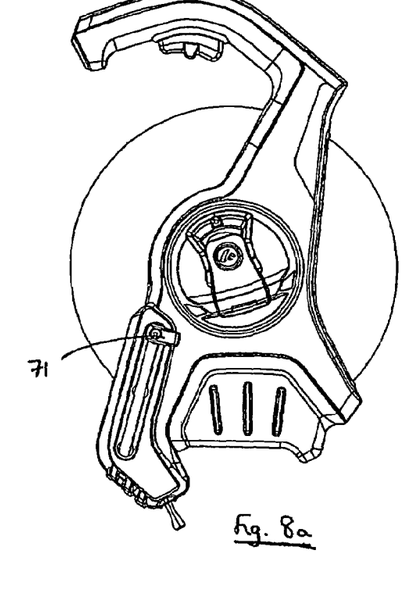
FIGS. 8a, 8b, 8c and 8d are side views of the tape measure to illustrate operation of a ground engaging spike described below.
Figure 8B:
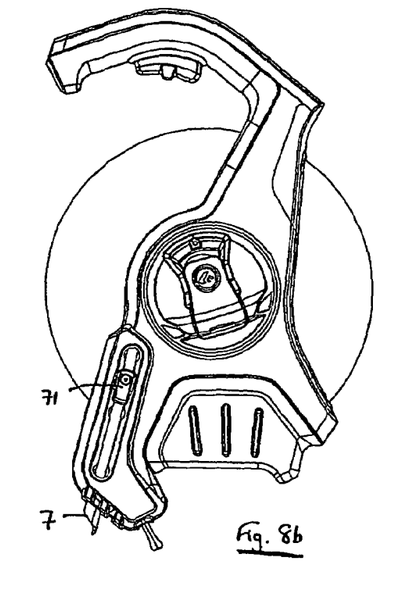
Figure 8C:
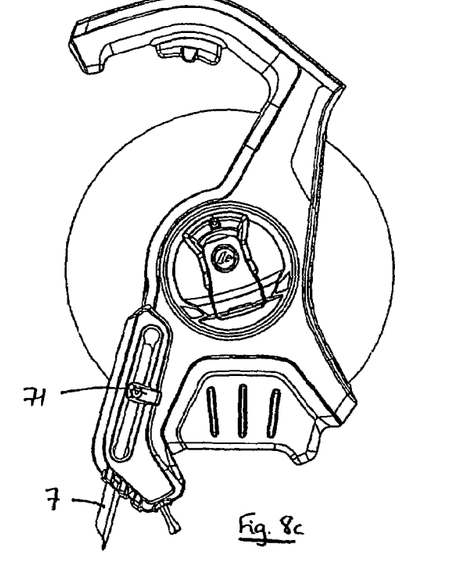
Figure 8D:
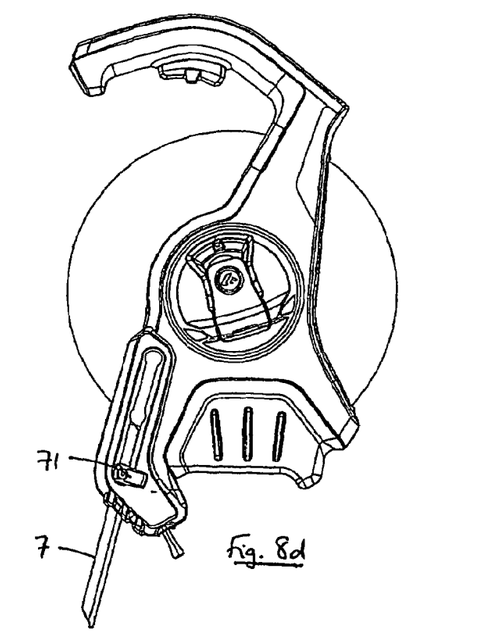

A locking knob 71 is attached to one side of the spike 7 and can be used to lock the spike in any of the retracted position (as seen in FIG. 8a), a fully extended position (FIG. 8d) and an intermediate position (FIG. 8c) between these two extremes. In the intermediate position the spike 7 extends to bring its bottom end generally into line with the bottom surface of the snout 6, allowing the snout and the spike to both rest on the ground to more surely locate the tape measure when a measurement is being taken (or to allow the spike to rest on the ground with the snout close to the ground, depending on how the user holds the tape measure). In the fully extended position the is lower end of the spike 7 extends beyond the bottom surface of the snout 6. In this configuration, the spike 7 can be imbedded in the ground to fix the position of the tape measure and even to support the tape measure (without the need for the operator to hold it) whilst measurements are being taken or distances measured out. This may be useful, for instance, when marking out a series of pitches along a line (as you might do on a building site or sports pitch for example), both ends of the tape be fixed to hold the tape taught whilst the pitches are marked off.

Figure 6:
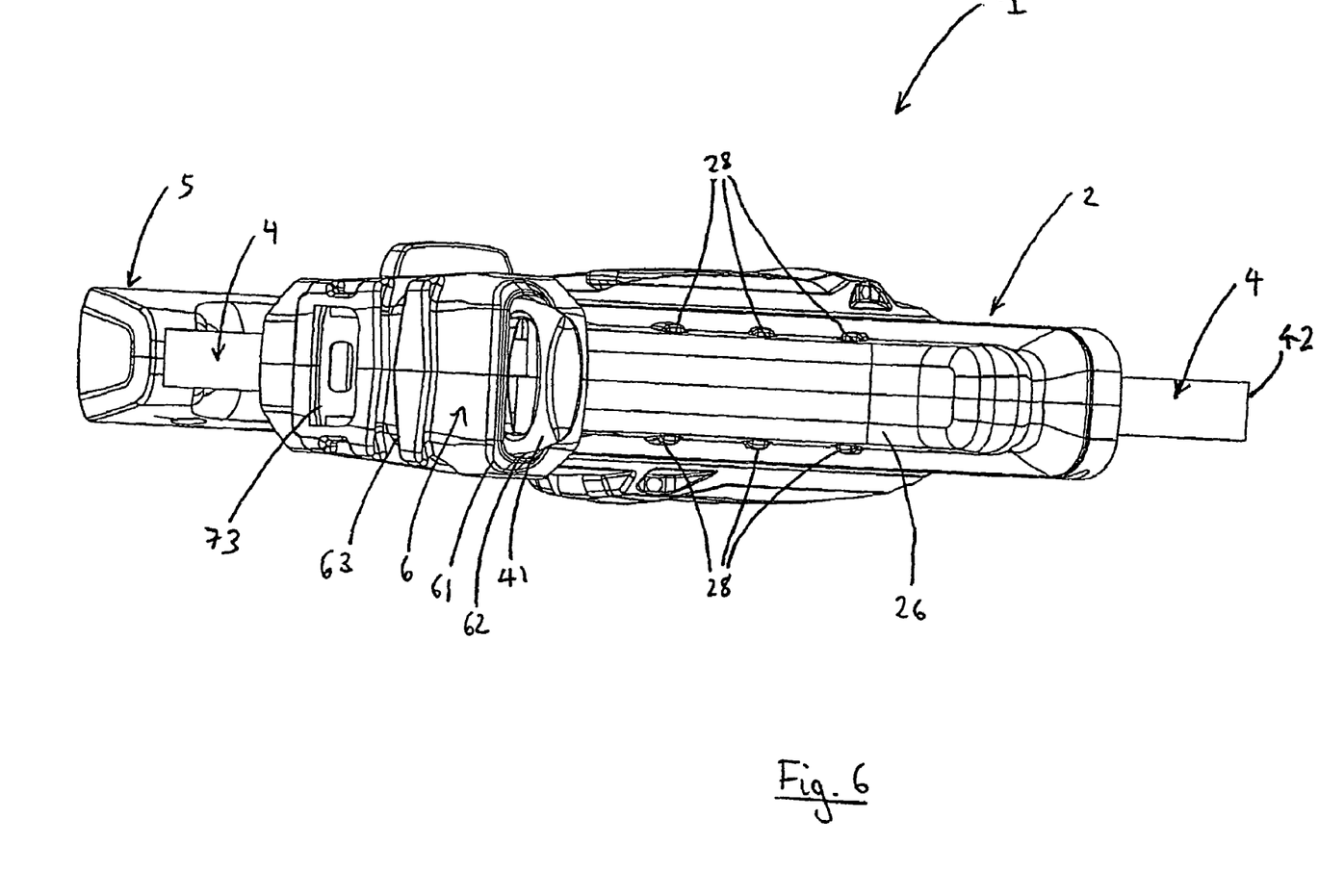
FIG. 6 is a bottom plan view of the tape measure.

The locking knob 71 protrudes through a slot 72 in the side wall 23 of the half shell 21a of the frame 2. The slot 72 is angled in the same direction as the longitudinal axis of the spike 7 and defines a path along which the knob 71 (and hence the upper end of the spike 7 to which it is attached) can travel when the knob 71 is unlocked to release the spike 7 for movement. In particular, the knob 71 can travel from a position adjacent the top 721 of the slot 2, where the spike is fully retracted within the frame 2, to toward the bottom 722 of the slot 2, where the spike 7 projects from a hole 73 positioned on the underside of the base 24 of the frame 2 (see FIG. 6).

Any of a number of suitable mechanisms may be used to lock the knob 71 in position relative to the slot 72 in which it slides. For instance, the portion of the knob 71 extending through the slot 72 can be shaped in cross-section such that in a first orientation it is free to move along the slot 72 but in a second orientation (e.g. turned through a predefined angle, e.g. 90 degrees—see FIG. 8b) it binds against the sides of the slot or engages with a formation (e.g. recess) on one or both sides of the slot. For example, the portion of the knob 71 extending through the slot 72 may have a cam-shape cross-section, end portions of which can engage recesses in the sides of the slot 72.

As an alternative, the locking knob 71 could be attached to a threaded spigot extending from the spike 7 through the slot so that the knob 71 can be tightened against the outside face of the half shell 21a adjacent the sides of the slot 72 by screwing it down onto the threaded spigot, locking the spike 7 in place.

The locking arrangement for the spike 7 may be adapted to enable the spike 7 to be locked only in one of a number of predetermined positions (e.g. only in the retracted, fully extended and intermediate positions referred to above). Alternatively, it may be adapted to enable the spike 7 to be locked in any position between the two extremes.

Figure 9:
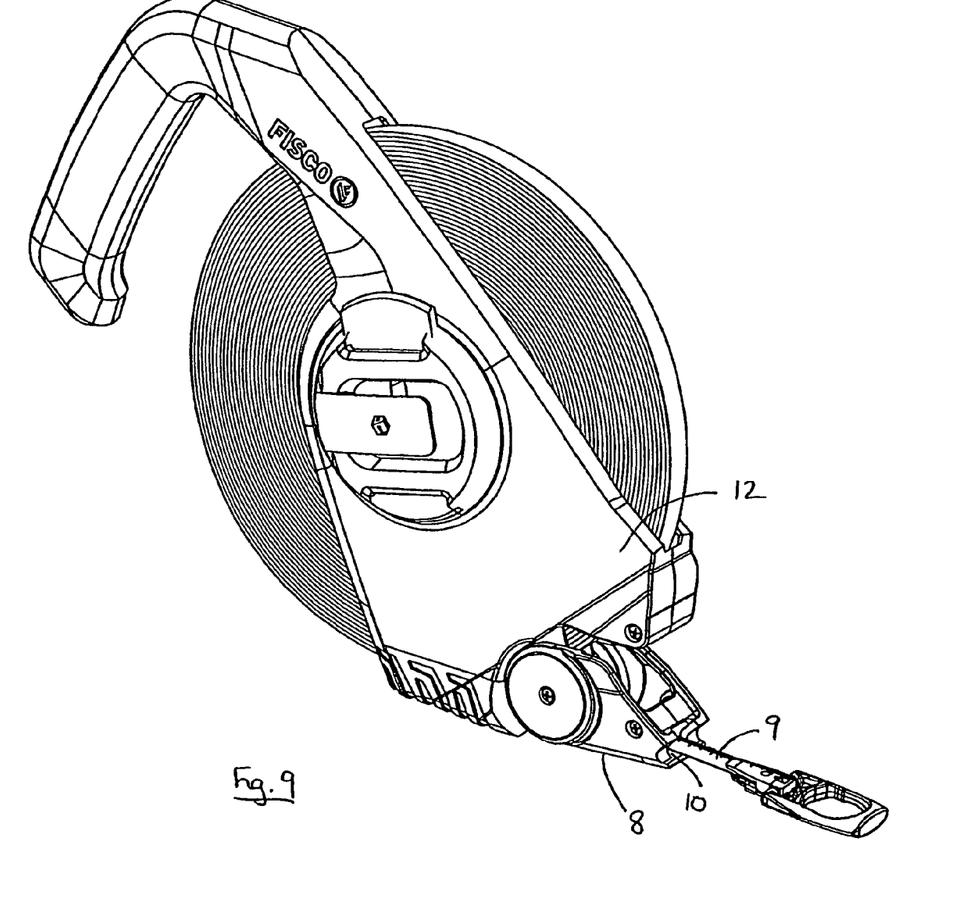
FIG. 9 is an oblique view of another tape measure showing a form of mouthpiece that can be used in tape measures according to embodiments of the present invention.
Figure 10:
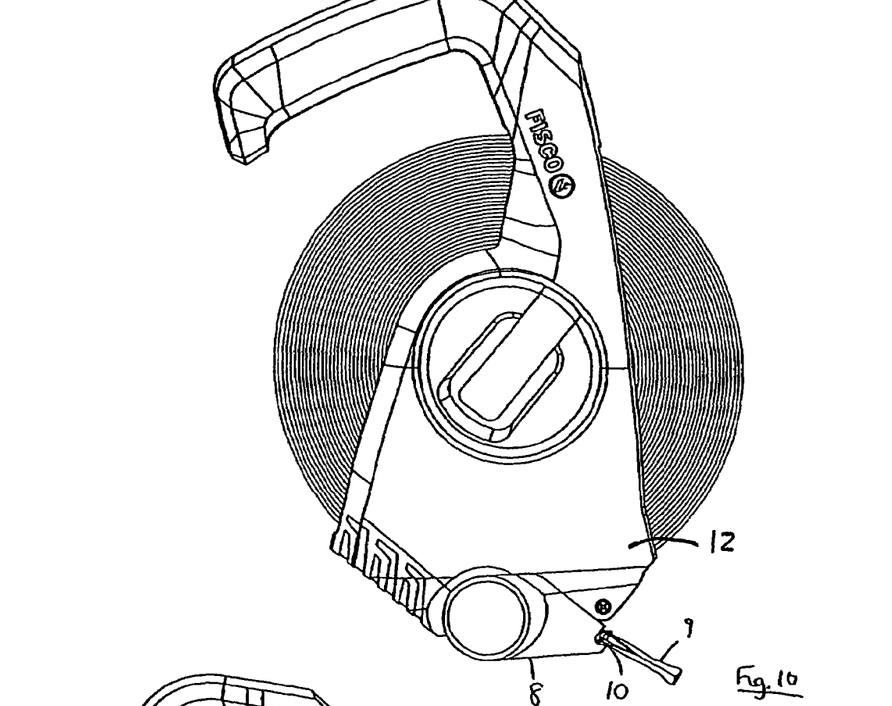
FIG. 10 is a side view of the tape measure of FIG. 9 with the mouthpiece in one configuration.
Figure 11:
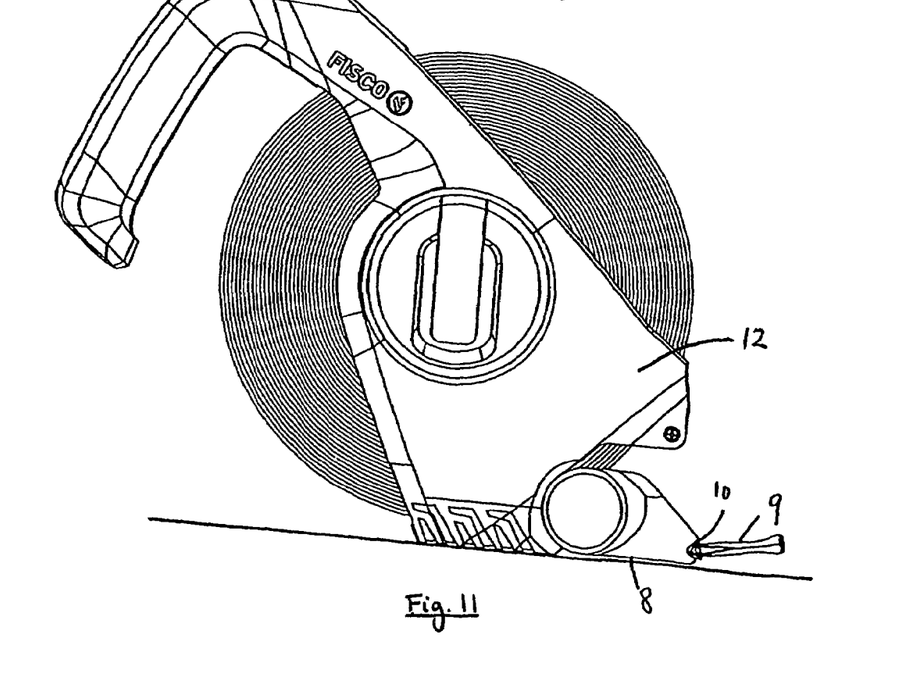
FIG. 11 is a side view of the tape measure of FIG. 9 with the mouthpiece in another configuration (as also seen in FIG. 9).

FIGS. 9, 10 and 11 illustrate another tape measure having an adjustable mouthpiece 8 that may be used in place of the snout 6 in the embodiment of the invention described above. The tape 9 is drawn from the reel through a slot 10 in the mouthpiece 8. The mouthpiece 8 is hinged to the main frame 12 of the tape measure so that it can rotate between a closed positions (FIG. 10) and a fully open position (FIG. 11). The mouthpiece 8 is biased by a spring (not shown) to the closed position seen in FIG. 10.

In use, the bias of the spring generally maintains the mouthpiece 8 at or close to the closed position as the tape 9 is pulled out or wound in through the slot 10 in the mouthpiece 8. When taking a measurement, however, if the tape 9 is put under tension (which is normal), the force applied counteracts the spring force and causes the mouthpiece to pivot to align itself with (or as close as the range of movement of the mouthpiece will allow to) the direction in which the tape is being tensioned. Especially when taking a measurement at ground level, the mouthpiece will move to the fully open position seen in FIG. 11 allowing, for example, the tape measure to be drawn out along the ground with an extremely small angle of attack to the ground. The tape graduations are also clearly visible at the mouthpiece position, allowing a very accurate measurement to be read off.

The invention claimed is:

1. A tape measure having a winding drum or reel rotatably mounted on a support structure, at least one winding handle, and a measuring tape attached to the drum so as to be coilable thereon, the support structure comprising a handle that extends radially beyond an upper half of the coiled tape and a bottom edge portion that extends radially beyond a lower half of the coiled tape, the bottom edge portion comprising a hand grip located and configured to allow a user to hold the tape measure by grasping the hand grip while operating a winding handle to rewind the tape.

2. A tape measure according to claim 1, wherein the handle and hand grip are diametrically opposite one another.

3. A tape measure according to claim 1, wherein the hand grip extends along the bottom edge of the support structure and on one side of the bottom edge portion of the support structure adjacent its bottom edge.

4. A tape measure according to claim 3, wherein the hand grip extends on both sides of the bottom edge portion of the support structure adjacent its bottom edge.

5. A tape measure according to claim 1, wherein one or more stepped features or shoulders define a boundary or portions of the boundary of the hand grip.

6. A tape measure according to claim 1, wherein the hand grip comprises one or more recessed or raised grip features.

7. A tape measure according to claim 1, wherein a surface of the hand grip is textured or contoured to improve the grip and/or shaped or otherwise configured to fit the palm grip of a user.

8. A tape measure according to claim 1, wherein the hand grip comprises a grip element applied to a surface of the bottom edge portion of the support structure.

9. A tape measure according to claim 8, wherein the grip element is formed from a material having a higher coefficient of friction than a surface of the support structure itself.

10. A tape measure according to claim 1, wherein the tape measure is a long tape.

11. A tape measure having a winding drum or reel rotatably mounted on a support structure, and a measuring tape attached to the drum so as to be coilable thereon, the support structure comprising a handle that extends radially beyond an upper half of the coiled tape and a bottom edge portion that extends radially beyond a lower half of the coiled tape, the bottom edge portion comprising a hand grip, wherein the hand grip defines a recess in the bottom edge portion of the support structure.

12. A tape measure according to claim 11, wherein the support structure comprises a first thickness and the hand grip comprises a second thickness, wherein the first thickness is greater than the second thickness.

13. A tape measure according to claim 12, wherein the tape measure further comprises a winding handle, and the hand grip extends radially below the winding handle when the winding handle is directed toward the hand grip.

14. A tape measure having a winding drum or reel rotatably mounted on a support structure, and a measuring tape attached to the drum so as to be coilable thereon, the support structure comprising a handle that extends radially beyond an upper half of the coiled tape and a bottom edge portion that extends radially beyond a lower half of the coiled tape, the bottom edge portion comprising a hand grip, wherein the tape measure includes a mouth aperture through which the tape is drawn off the winding drum and the hand grip extends forward of this mouth above a projection of the path the tape follows as it exits the mouth.

15. A tape measure according to claim 14, wherein the mouth is formed at a lower end of a snout portion of the support structure that projects below the bottom edge portion of the support structure in which the hand grip is formed.

16. A tape measure having a winding drum rotatably mounted on a support structure, a measuring tape attached to the drum so as to be coilable thereon and a mouth through which the tape measure is drawn off the drum, the support structure comprising a hand grip at an edge portion radially beyond the coiled tape, the hand grip extending forward of the mouth above a projection of the path the measuring tape follows as it exits the mouth.

17. A tape measure according to claim 16, wherein the mouth is formed at a lower end of a snout portion of the support structure that projects below the bottom edge portion of the support structure in which the hand grip is formed.

18. A tape measure according to claim 16, wherein the tape measure is a long tape.

19. A tape measure having a winding drum or reel rotatably mounted on a support structure, at least one winding handle, and a measuring tape attached to the drum so as to be coilable thereon, the support structure comprising a handle that extends radially beyond an upper half of the coiled tape and a bottom edge portion that extends radially beyond a lower half of the coiled tape, the bottom edge portion comprising a hand grip, and the hand grip extends radially below the winding handle when the winding handle is directed toward the hand grip.

20. A tape measure according to claim 19, wherein the hand grip is located and configured to allow a user to hold the tape measure by grasping the hand grip while operating a winding handle to rewind the tape.

* * * * *